(12) United States Patent
Ito et al.

(10) Patent No.: US 7,700,129 B2
(45) Date of Patent: *Apr. 20, 2010

(54) POLYMER ACTUATOR

(75) Inventors: Hidetoshi Ito, Kanagawa (JP); Koichiro Kezuka, Kanagawa (JP)

(73) Assignee: Sony Corporation, Tokyo (JP)

( * ) Notice: Subject to any disclaimer, the term of this patent is extended or adjusted under 35 U.S.C. 154(b) by 107 days.

This patent is subject to a terminal disclaimer.

(21) Appl. No.: 10/598,958

(22) PCT Filed: Mar. 3, 2005

(86) PCT No.: PCT/JP2005/004164

§ 371 (c)(1),
(2), (4) Date: Sep. 15, 2006

(87) PCT Pub. No.: WO2005/091487

PCT Pub. Date: Sep. 29, 2005

(65) Prior Publication Data

US 2007/0190150 A1  Aug. 16, 2007

(30) Foreign Application Priority Data

Mar. 18, 2004 (JP) .......................... P2004-078131

(51) Int. Cl.
*A61K 9/00* (2006.01)
(52) U.S. Cl. .................. 424/486; 435/173.6; 310/300; 310/311; 310/800
(58) Field of Classification Search .......... None
See application file for complete search history.

(56) References Cited

U.S. PATENT DOCUMENTS 5,250,167 A * 10/1993 Adolf et al. ............... 310/309
6,249,076 B1 * 6/2001 Madden et al. ............ 310/363
6,475,639 B2 * 11/2002 Shahinpoor et al. ......... 428/614

FOREIGN PATENT DOCUMENTS

| JP | 2-41685 | | 2/1990 |
| JP | 402041685 A | * | 2/1990 |
| JP | 05-076599 | | 3/1993 |
| JP | 05-184531 | | 7/1993 |
| JP | 06-006991 | | 1/1994 |
| JP | 08-086272 | | 4/1996 |
| JP | 2001-170884 | | 6/2001 |

OTHER PUBLICATIONS

Hirai et al. (2003) Proceedings of the SPIE 5051: 198-206.*
International Search Report dated Apr. 19, 2005.

* cited by examiner

*Primary Examiner*—Lisa J Hobbs
(74) *Attorney, Agent, or Firm*—K&L Gates LLP

(57) ABSTRACT

To provide a polymer actuator which is light in weight and capable of linear expansion and contraction with a low voltage.

The polymer actuator 1 is composed of a plurality of gel/electrode complexes arranged in an electrolytic aqueous solution 6, said gel/electrode complex being composed of a polymer gel (2a, 2b) containing at least either of acidic or basic functional groups and electrodes (3a, 3b) placed in the polymer gel, said electrodes being made of a material capable of occluding and releasing hydrogen electrochemically, such that the polymer gel (2a, 2b) in the gel/electrode complex changes in pH upon application of voltage across the electrodes (3a, 3b) of the gel/electrode complexes (4a, 4b) and each of the gel/complexes changes in volume in response to the pH change.

13 Claims, 3 Drawing Sheets

POLYMER ACTUATOR

CROSS REFERENCE TO RELATED APPLICATIONS

The present application claims priority to Japanese Patent Document No. P2004-078131 filed on Mar. 18, 2004, the disclosure of which is herein incorporated by reference.

BACKGROUND

The present invention relates to a polymer actuator.

The usefulness of robots is attracting attention in various fields including nursing care service, dangerous work, and entertainment. Robots suitable for these uses are required to have articulations (movable parts) similar to those of animals that permit complex movements.

A conventional actuator to drive these movable parts is a magnetic rotary motor. This actuator, however, suffers the disadvantage of being heavy because it is made of metal.

Weight of actuators built into movable parts add to loads. Heavy actuator needs large outputs, and powerful actuators are large and heavy. This is a difficult-to-solve contradictory problem.

Moreover, magnetic rotary motors require speed reducers to control rotating speed and torque. Speed reducers deteriorate with time as gears therein wear out.

Ultrasonic motors producing a high torque at a low rotating speed do not need speed reducers; but they are also heavy (and hence poses the same problem as mentioned above) because they are made of metal.

For this reason, there have recently been developed polymer actuators in which a light flexible polymeric material plays an important role.

They include polymeric piezoelectric elements (which employ polyvinylidene fluoride), conducting polymer actuators (which employ electron conducting polymers), and gel actuators (which employ polymeric gel).

The gel actuator, particularly the one which employs a water-swelling polymeric hydrogel, relies for its action on a polymeric hydrogel which changes in volume in response to temperature, ionic strength, and pH in its environment. The amount of change in volume is 30 to 50% and the change in volume generates a force of 0.2 to 0.4 MPa. This performance is comparable to that of skeletal muscles.

The polymeric hydrogel, however, has some disadvantages. It cannot be heated or cooled rapidly. It needs an electrolytic solution to control ion concentrations, which has to be circulated by a pump and stored in a reservoir. Consequently, it is not suitable for small, light systems.

There is another type of polymeric hydrogel, which is called a pH-responsive polymeric hydrogel. This hydrogel changes in volume (by electrochemical reactions) depending on the pH of its surrounding aqueous solution.

It is possible to drive and control the pH-responsive hydrogel by utilizing the phenomenon that pH changes in the neighborhood of electrodes and concentration gradient occurs due to electrical double layers formed on electrode surfaces when a voltage is applied across electrodes placed in an electrolytic aqueous solution.

The above-mentioned pH-responsive hydrogel has acidic or basic functional groups in the polymer constituting the gel, so that the gel swells (or changes in volume) depending on pH in the aqueous solution surrounding it.

For example, the one having acidic functional groups works in the following way. When it is in an electrolytic aqueous solution with a high pH, the acidic groups in the gel dissociate protons to become anions, thereby increasing in hydrophilicity and generating repulsive forces in or between negatively charged molecules. This causes the gel to swell. Conversely, in an electrolytic aqueous solution with a low pH, the acidic groups in the gel do not dissociate but form hydrogen bond between them. This causes the gel to shrink.

By contrast, a pH-responsive polymeric hydrogel which has basic groups works in an opposite way. That is, in an electrolytic aqueous solution with a high pH, the basic groups in the gel protonize to become cations, thereby increasing in hydrophilicity and generating repulsive force in or between positively charged molecules. This causes the gel to swell.

Thus, when in use, the pH-responsive polymeric hydrogel is immersed in an electrolytic aqueous solution, and a voltage of about 1 to 3 V is applied across electrodes placed therein. This voltage forms an ion concentration gradient in the electrolytic aqueous solution and changes the pH value in the neighborhood of the electrodes. This mechanism makes it possible to control the swelling and shrinkage of the pH-responsive polymeric hydrogel only with a low voltage without requiring heating and cooling units, pumps, and reservoirs.

The deformation that takes place as mentioned above may be used for an actuator. In fact, there is known an actuator which electrochemically produces curved displacement from a pH-responsive polymeric hydrogel film held between electrodes connected to a voltage source. See Patent Document 1 (JP-B No. Hei-7-97912).

Unfortunately, the actuator of curved displacement type is hardly applicable to robot articulations unlike the actuator capable of linearly expanding and contracting like skeletal muscles. Thus there has been a demand for the actuator which linearly expands and contracts like skeletal muscles.

The gel can be made to expand (elongate) and contract without curving if the distance between electrodes is increased and the gel is brought nearer to one electrode so that the gel is less affected by the other electrode. However, it is very difficult to fix the gel near one electrode while allowing the gel to expand and contract freely.

Application of a voltage across electrodes changes pH near the electrodes. Unfortunately, voltage application brings about the electrolysis of water, which decreases the $OH^-$ concentration due to oxidation near the anode, thereby lowering the pH and generating oxygen gas, and which also decreases the $H^+$ concentration due to reduction near the cathode, thereby raising the pH and generating hydrogen gas. The pH change may occur at a place comparatively far from the electrodes when current flowing across the electrodes increases; however, the evolution of oxygen and hydrogen gases and the consumption of water (as a solvent for electrolyte) still pose a problem with designing a closed actuator element.

SUMMARY

The present invention was completed in order to address the above-mentioned problems. It is an object of the present invention to provide a closed polymer actuator which is capable of linearly expanding and contracting without curved displacement and which is also light in weight and capable of operation at a low voltage without gas evolution and water consumption.

The present invention is directed to a polymer actuator which comprises a plurality of gel/electrode complexes arranged in an electrolytic aqueous solution, said gel/electrode complex being composed of a polymer gel containing at least either of acidic or basic functional groups and electrodes placed in the polymer gel, said electrodes being made of a material capable of occluding and releasing hydrogen electrochemically, such that the polymer gel in the gel/electrode complex changes in pH upon application of voltage across the electrodes of the gel/electrode complexes and each of the gel/complexes changes in volume in response to the pH change.

Additional features and advantages of the present invention are described in, and will be apparent from, the following Detailed Description and the Figures.

DETAILED DESCRIPTION

The polymer actuator according to one embodiment of the present invention will be described with reference to the accompanying drawings. The following description is not intended to restrict the scope of the present invention.

Figure 1:
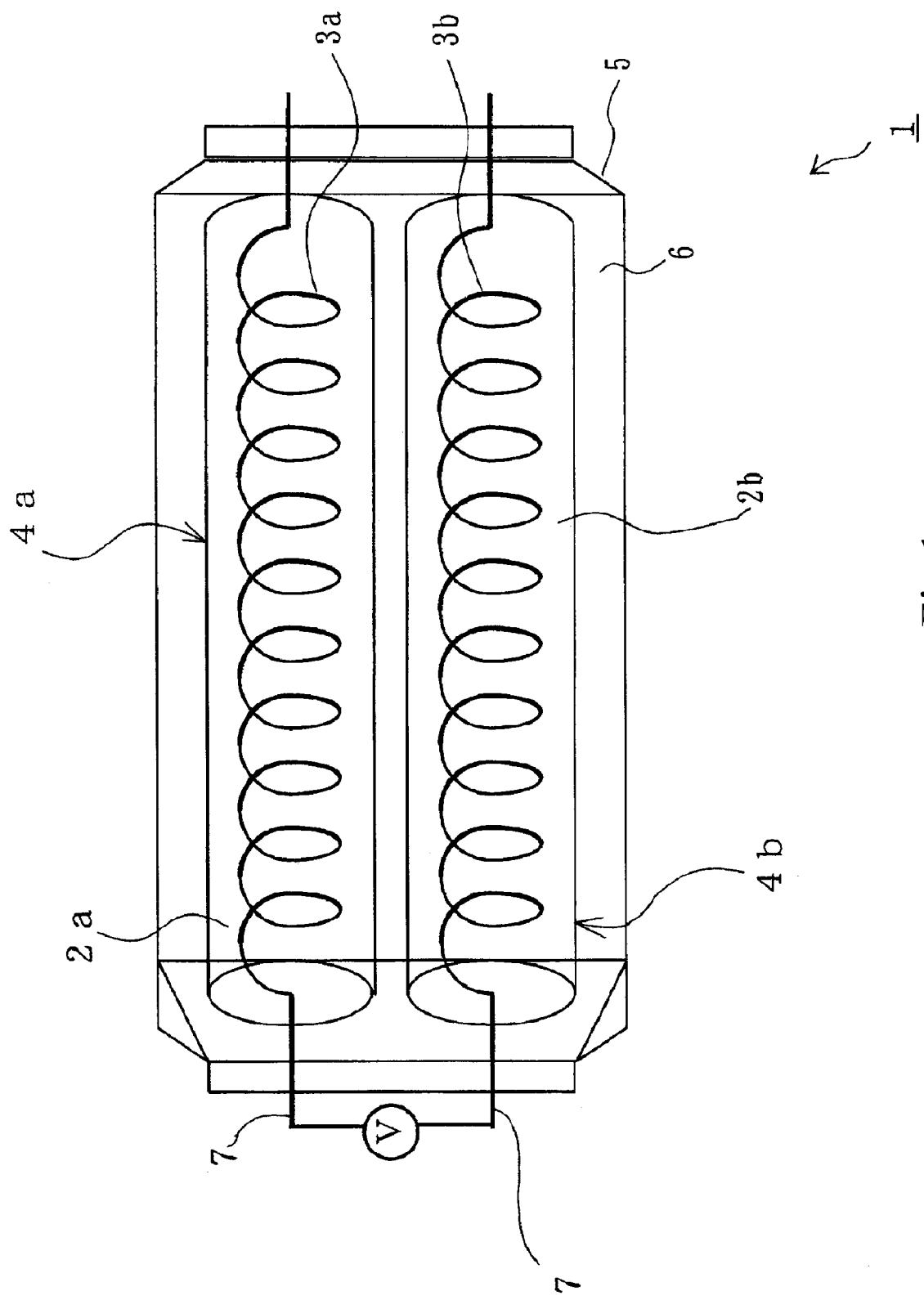
FIG. 1 is a schematic diagram showing the structure of the polymer actuator according to one embodiment of the present invention.

A preferred example of the polymer actuator according to the present invention is constructed of one unit of the gel/electrode complex, with the polymer gel having acidic functional groups, and one unit of the gel/electrode complex, with the polymer gel having basic functional groups, as mentioned below. This example is not intended to restrict the scope of the present invention. FIG. 1 is a schematic diagram showing the polymer actuator 1 according to the present invention.

The polymer actuator 1 shown in FIG. 1 is constructed of a gel/electrode complex 4a and a gel/electrode complex 4b. The gel/electrode complex 4a is composed of a polymeric hydrogel 2a having acidic functional groups and an electrode 3a placed therein. (It will occasionally be called acidic gel/electrode complex hereinafter.) The gel/electrode complex 4b is composed of a polymeric hydrogel 2b having basic functional groups and an electrode 3b placed therein. (It will occasionally be called basic gel/electrode complex hereinafter.)

The gel/electrode complexes 4a and 4b are arranged in the closed container 5, which is filled with the electrolytic aqueous solution 6. The electrodes 3a and 3b pass through the ends of the container 5.

Incidentally, the gel/electrode complexes 4a and 4b are approximately parallel to each other. The container 5 should preferably be made of a material capable of expanding and contracting in response to the volume change of the gel/electrode complexes 4a and 4b.

Upon voltage application across the electrodes 3a and 3b of the gel/electrode complexes 4a and 4b, the polymeric hydrogels 2a and 2b change in pH and the gel/electrode complexes 4a and 4b change in volume in response to the pH change.

It is assumed that the electrodes 3a and 3b are made of a material capable of occluding and releasing hydrogen electrochemically.

The electrodes made of such a specific material work in the following way. The anode releases hydrogen to increase the $H^+$ concentration and lower the pH value in its vicinity. The cathode occludes $H^+$ (by reduction) to decrease the $H^+$ concentration and raise the pH value in its vicinity. This mechanism permits the pH change in the polymeric hydrogels 2a and 2b without the evolution of gases (oxygen and hydrogen) and the consumption of water.

The polymer actuator constructed as mentioned above experiences expansion and contraction by the mechanism explained below with reference to FIGS. 2A and 2B.

It is assumed that the electrode 3a of the acidic gel/electrode complex 4a is an anode and the electrode 3b of the basic gel/electrode complex 4b is a cathode. Application of a voltage (1 to 3 V) across these electrodes lowers the pH value in the polymeric hydrogel 2a (or in the vicinity of the anode 3a). With the pH value lowered, acidic groups in the acidic gel/electrode complex 4a do not dissociate but form hydrogen bonds with each other, so that the acidic gel/electrode complex 4a contracts. By contrast, application of a voltage (1 to 3 V) across these electrodes raises the pH value in the polymeric hydrogel 2b (or in the vicinity of the cathode 3b). With the pH value raised, basic groups in the basic gel/electrode complex 4b do not protonize but form hydrogen bonds with each other, so that the acidic gel/electrode complex 4b contracts. (FIG. 2A) When voltage is removed or when voltage polarity is reversed, the pH value in the acidic gel/electrode complex 4a increases. The pH increase causes the acidic groups in the acidic gel/electrode complex 4a to become anions, with the acidic groups dissociating protons, thereby making the acidic gel more hydrophilic and increasing intra- or inter-molecular repulsive force due to negative charges. As the result, the acidic gel/electrode complex 4a expands. On the other hand, the pH value in the basic gel/electrode complex 4b decreases. The pH decrease causes the basic groups in the basic gel/electrode complex 4b to become cations, with the basic groups protonized, thereby making the basic gel more hydrophilic and increasing intra- or intermolecular repulsive force due to positive charges. As the result, the basic gel/electrode complex 4b expands. (See FIG. 2B.)

The polymer actuator 1 according to the present invention has the gel/electrode complexes 4a and 4b arranged in the electrolytic aqueous solution 6, so that the gel/electrode complexes 4a and 4b change in volume upon voltage application across the electrodes 3a and 3b of the gel/electrode complexes 4a and 4b, as mentioned above. Therefore, it obviates the necessity for cooling and heating units, pumps, and reservoirs, and it is light in weight and is capable of control at a low voltage (say, 1 to 3 V) unlike the conventional actuator that changes in volume in response to temperature and ion intensity.

In addition, the gel/electrode complexes 4a and 4b are constructed of polymeric hydrogels 2a and 2b having acidic or basic functional groups, and the electrodes 3a and 3b arranged in the polymeric hydrogels 2a and 2b. Consequently, both of the gel/electrode complexes 4a and 4b expand and contract in the same direction upon voltage application. The gel/electrode complexes 4a and 4b in a rodlike shape as illustrated expand and contract linearly without curved displacement unlike the conventional ones.

The gel/electrode complexes 4a and 4b change in volume in such a way that the polymeric hydrogels 2a and 2b do not separate from the electrodes 3a and 3b. Thus, the pH change is efficiently transmitted to the gel/electrode complexes 4a and 4b. This leads to efficient expansion and contraction.

The volume change of the gel/electrode complexes 4a and 4b generates a force large enough to actuate robot's articulations (movable parts).

The polymer actuator 1 according to the present invention has the gel/electrode complexes 4a and 4b, in which the electrodes 3a and 3b should preferably have a shape which readily follows the volume change of the polymeric hydrogels 2a and 2b. For example, they should preferably be a coiled metal wire as shown in FIGS. 1 to 3B. In this case, the coil follows the volume change of the gel/electrode complexes 4a and 4b through its elastic deformation. The coiled metal wire should preferably be thin and flexible so that it easily follows the volume change.

In the polymer actuator according to the present invention, the electrodes 3a and 3b arranged in the gel/electrode complexes 4a and 4b should be formed from a material capable of occluding and releasing hydrogen electrochemically. This material permits the pH change in the polymeric hydrogels 2a and 2b without gas evolution and water consumption. Thus there is obtained the closed actuator element.

The material capable of occluding and releasing hydrogen electrochemically is not specifically restricted; it may be selected from any known metals, inorganic compounds, and organic compounds, such as metal hydride and hydrogen occluding alloy (known as a cathode material for the nickel-hydrogen secondary battery). The latter is suitable because of its high hydrogen occluding amount. These materials may be used alone or in combination with other materials (in the form of mixture or alloy).

Preferable among these materials is palladium (Pd) that forms metal hydride. It occludes and releases hydrogen electrochemically and it is also more resistant to dissolution or passivation due to oxidation or reduction upon voltage application as compared with other metal hydrides and hydrogen occluding alloys. Another suitable material is a hydrogen occluding alloy liable to dissolution and passivation which is covered with a material (such as palladium) which is resistant to dissolution and passivation and is permeable to hydrogen.

The electrolytic aqueous solution 6 may be an aqueous solution containing any known water-soluble electrolyte.

The concentration of the electrolyte in the electrolytic aqueous solution 6 should be 0.01 to 0.5 $mol/dm^3$. As the concentration of the electrolyte increases, the ionic conductivity increases and the pH change occurs rapidly. However, the electrolytic aqueous solution 6 with a high concentration absorbs water from the polymeric hydrogels 2a and 2b due to difference in osmotic pressure. This prevents the expansion of the gel/electrode complexes 4a and 4b. By contrast, the electrolytic aqueous solution 6 with a low concentration does not prevent the expansion of the gel/electrode complexes 4a and 4b, but it may be slow in response.

The container 5 is one which holds the electrolytic aqueous solution 6. It also functions as a terminal which converts the displacement of the gel/electrode complexes 4a and 4b into a mechanical work.

The container 5 may broadly vary in shape and material; it is required to tightly seal the electrolytic aqueous solution 6 and to be flexible enough to permit the displacement of the gel/electrode complexes 4a and 4b. It should preferably be a baglike container made of film of polymeric material such as polyethylene, polypropylene, polyvinyl chloride, polyvinylidene chloride, and fluorocarbon resin.

The electrodes 3a and 3b of the gel/electrode complexes 4a and 4b are electrically connected to the electrode terminal 7, and they project outward from the container 5 while keeping the container 5 air tight.

The gel/electrode complexes 4a and 4b have their ends fixed to the container 5, so that the container 5 expands and contract as they change in volume or in response to their displacement.

Therefore, the ends 5' of the container may be fixed to a mechanism (not shown) to be moved for mechanical work.

The end of the container 5 to which the gel/electrode complexes 4a and 4b are fixed may function as the electrode terminal 7.

If the container 5 is not flexible, the ends 5' may not be fixed to the container 5 but may be slidable along the wall surface of the container 5, so that the container 5 follows the volume change of the gel/electrode complexes 4a and 4b.

In the polymer actuator according to the present invention, the polymer gel constituting the gel/electrode complexes may contain both acidic functional groups and basic functional groups.

In this case, expansion takes place as the basic groups cationize when the pH value of the electrolytic solution is low in the gel/electrode complex. When the pH value is high, expansion also takes place as the acidic groups anionize. However, in the neutral region, both ionized functional groups form ion complexes through ionic bond, which results in contraction.

This phenomenon was confirmed to occur also in the case where the polymer gel constituting the gel/electrode complexes is composed of a polymer having acidic functional groups and a polymer having basic functional groups.

The gel/electrode complex mentioned above functions such that the gel expands whenever the electrode potential is made either noble or base in the neutral electrolytic solution and it contracts when the electrode potential is restored to an equilibrium.

Consequently, this obviates the necessity of using two kinds of gels for the cathode and anode. The gel/electrode complexes produce linear displacement upon application of voltage across the electrodes of the gel/electrode complexes of the same structure.

Figure 4A:
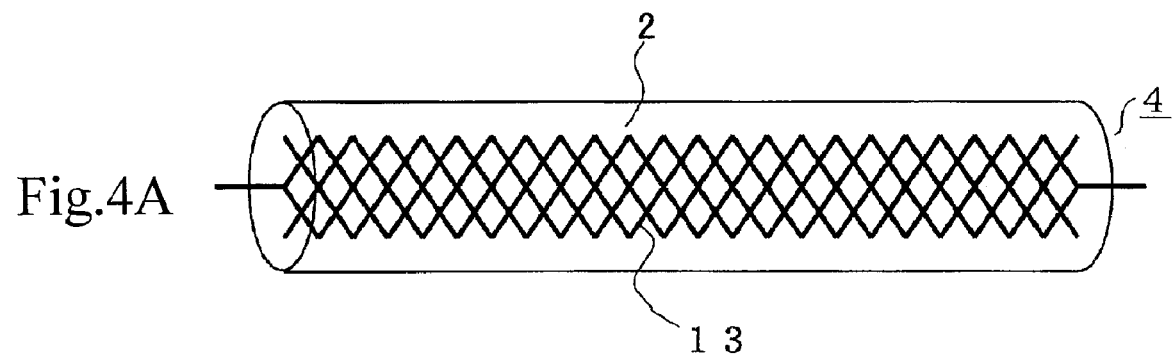
FIGS. 4A and 4B are schematic perspective views showing gel/electrode complex constituting the polymer actuator according to another embodiment of the present invention. They show the gel/electrode complex in its expanded (elongated) state and contracted state, respectively.
Figure 4B:
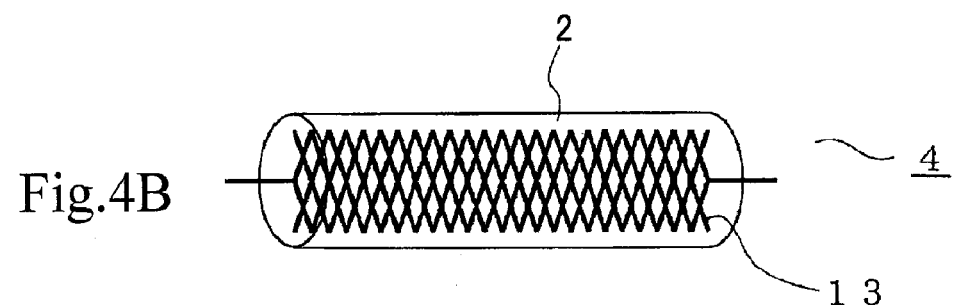

The electrode for the gel/electrode complexes may be a coiled object as illustrated in FIGS. 1 to 3B; however, the electrode for the polymer actuator of the present invention is not limited to such a coiled object. It may take on any shape that smoothly follows the volume change of the polymer gel. An example is a mesh-like object shown in FIGS. 4A and 4B. The mesh-like object also follows the volume change of the polymer gel through its elastic deformation as in the case of coiled object mentioned above. The mesh-like object should preferably be formed from fine flexible wires.

The electrode of the gel/electrode complexes is not limited to coiled object or mesh-like object mentioned above; it may be formed from any granular or fibrous material mixed with or dispersed in the polymer gel. In this case, too, it effectively induces the pH change without interfering with the volume change of the polymer gel.

Moreover, the electrode of the gel/electrode complexes may be a combination of a coiled object or mesh-like object and a granular or fibrous material. The resulting electrode will induce the pH change more effectively.

The polymer gel having acidic or basic functional groups which constitutes the gel/electrode complexes include polymers having acidic functional groups, such as carboxylic acid and sulfonic acid, and polymer having basic functional groups, such as primary amine, secondary amine, and thirdly amine.

Examples of the polymers having acidic functional groups include polymers of acrylic acid, methacrylic acid, vinyl acetate, maleic acid, itaconic acid, vinylsufonic acid, and styrenesulfonic acid.

Examples of the polymers having basic functional groups include polymers of ethyleneimine, allylamine, vinylpyridine, lysine, vinylaniline, vinylimidazole, aminoethyl acrylate, methylaminoethyl acrylate, dimethylaminoethyl acrylate, ethylaminoethyl acrylate, ethylmethylaminoethyl acrylate, diethylaminoethyl acrylate, aminoethyl methacrylate, methylaminoethyl methacrylate, dimethyaminoethyl methacrylate, ethylaminoethyl methacrylate, ethylmethylaminoethyl methacrylate, diethylaminoethyl methacrylate, aminopropyl acrylate, methylaminopropyl acrylate, dimethylaminopropyl acrylate, ethylaminopropyl acrylate, ethylmethylaminopropyl acrylate, diethylaminepropyl acrylate, aminopropyl methacrylate, methylaminopropyl methacrylate, dimethylaminopropyl methacrylate, ethylaminopropyl methacrylate, ethylmethylaminopropyl methacrylate, diethylaminopropyl methacrylate, dimethylaminoethylacrylamide, and dimethylaminopropylacrylamide.

If necessary, these polymers may have intra- or inter-molecular crosslinking or may be mixed with other polymers. They may also be in the form of copolymer composed of different monomers.

The gel/electrode complexes are not limited in their number so long as at least two units are used in combination. In the case where more than one gel/electrode complex of polymer gel containing acidic functional groups and more than one gel/electrode complex of polymer gel containing basic functional groups are used in combination, it is necessary that the number of the former be equal to the number of the latter because the former is given negative voltage and the later is given positive voltage.

In the case where the polymer gel constituting the gel/electrode complexes contains a polymer having acidic functional groups and basic functional groups, or in the case where the polymer gel constituting the gel/electrode complexes contains a mixture of polymers each having acidic functional groups and basic functional groups, the total number of the gel/electrode complexes should preferably be even so that half of them are given negative voltage and another half of them are given positive electrode.

The invention will be described with reference to the following examples in which the polymer actuator of the present invention is actually prepared and operated.

EXAMPLE 1

In this example, the polymeric hydrogel for the gel/electrode complexes is prepared from an aqueous solution of monomer, crosslinking agent, and initiator by radical polymerization.

The monomer for the polymer having acidic functional groups is sodium acrylate. The crosslinking agent is N,N'-methylenebisacrylamide. The initiator is ammonium persulfate. The aqueous solutions (as the gel precursor) is composed of the monomer, crosslinking agent, and initiator in a molar ratio of 100:3:1.

The electrode is a coil (1 mm in diameter) of platinum wire (10 μm in diameter). It is placed in a glass tube, 1.5 mm in inside diameter and 30 mm long, and then it is fixed so that the axis of the coil coincides with the axis of the glass tube.

The glass tube is filled with the gel precursor solution. With its both ends closed by rubber stoppers, the filled glass tube is heated at 50° C. so that the gel precursor solution undergoes gelation. The resulting gel is discharged by applying pressure to one end of the glass tube. Thus there is obtained the acidic gel/electrode complex (in which the polymer gel contains acidic functional groups).

The acidic gel/electrode complex is immersed in an aqueous solution of nitric acid (0.01 mol/dm$^3$), so that it is contracted. Then, the acidic gel/electrode complex is immersed in an aqueous solution of sodium nitrate (0.05 mol/dm$^3$). The acidic gel/electrode complex, in combination with a platinum counter electrode and a silver/silver chloride reference electrode, is given a potential of −1.0 V so that it is allowed to swell.

Also, another gel precursor solution is prepared in the form of aqueous solution of dimethylaminomethyl acrylate (as a monomer for the polymer having basic functional groups), N,N'-methylenebisacrylamide (as a crosslinking agent), and ammonium persulfate (as an initiator), which are mixed in a molar ratio of 100:3:1. It is made into the basic gel/electrode complex (in which the polymer gel contains basic functional groups) in the same way as mentioned above for the acidic gel/electrode complex.

The thus obtained basic gel/electrode complex is immersed in an aqueous solution of nitric acid (0.01 mol/dm$^3$) so that it is allowed to swell.

Each of the acidic gel/electrode complex and basic gel/electrode prepared as mentioned above is placed in a tubular polyethylene film, 6 mm in diameter and 50 mm long, and one end thereof is heat-sealed.

The tubular polyethylene film is filled with an aqueous solution of sodium nitrate (0.05 mol/dm$^3$) through the open end, which is subsequently heat-sealed. Incidentally, heat sealing is performed in such a way that the coil extending outward from the ends of the tubular polyethylene film is fixed in the polyethylene film.

Figure 2A:
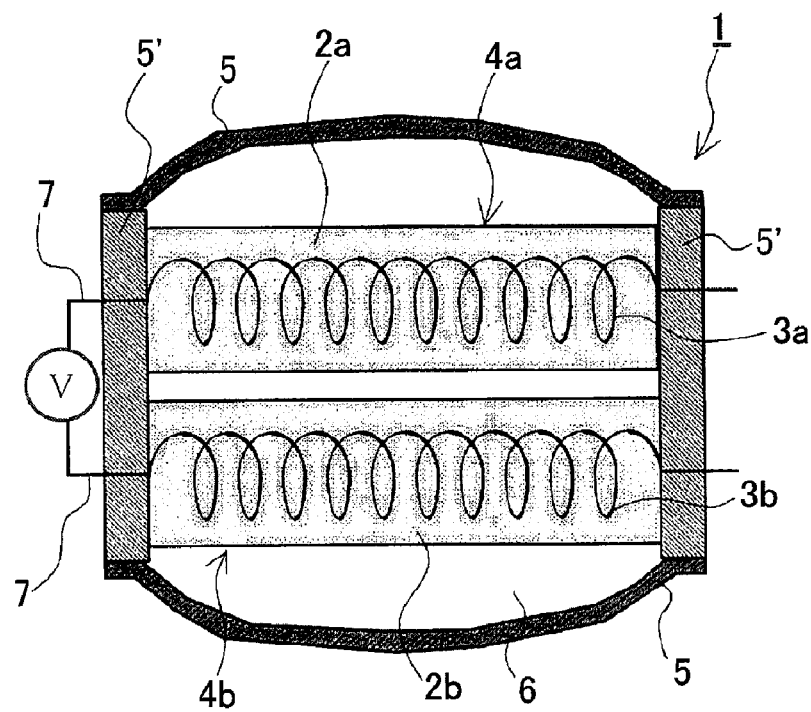
FIGS. 2A and 2B are schematic sectional views showing the polymer actuator according to one embodiment of the present invention. They show the polymer actuator in its contracted state and expanded state, respectively.
Figure 2B:
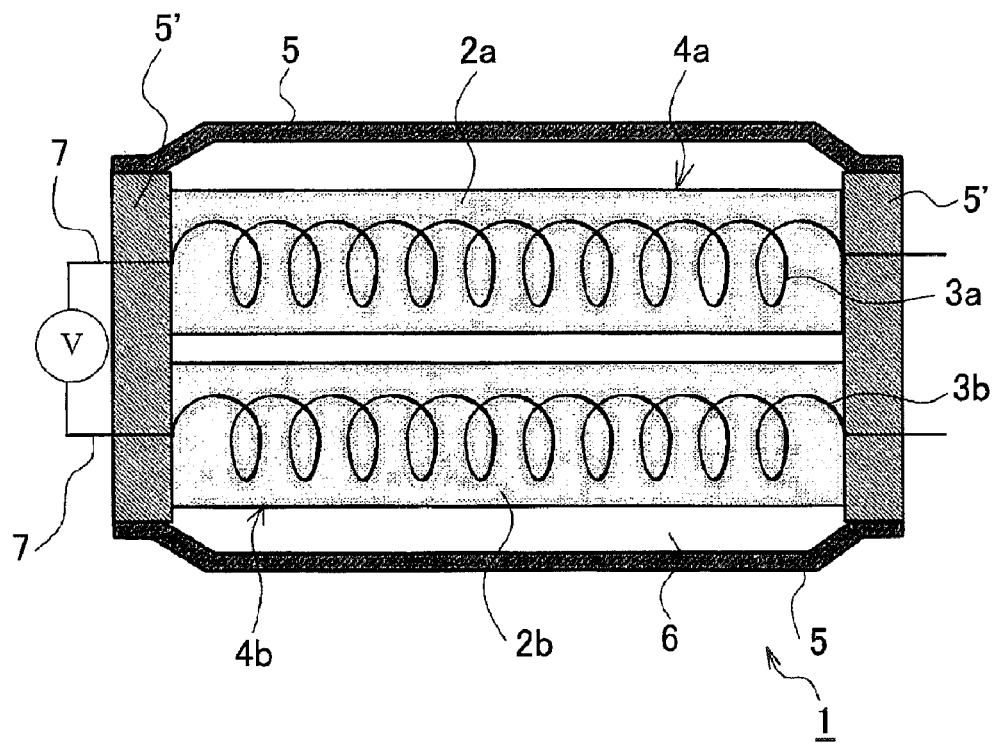
Figure 3A:
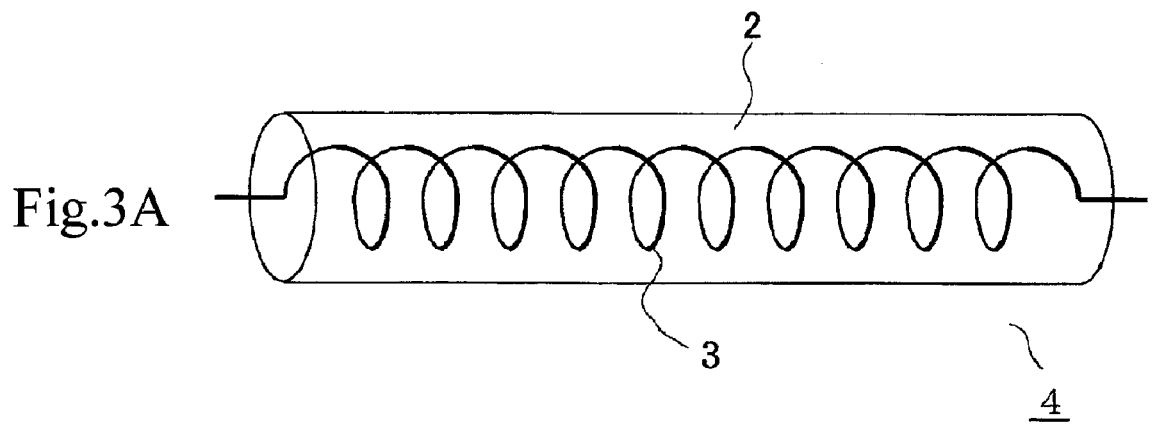
FIGS. 3A and 3B are schematic perspective views showing gel/electrode complex constituting the polymer actuator according to one embodiment of the present invention. They show the gel/electrode complex in its expanded (elongated) state and contracted state, respectively.
Figure 3B:
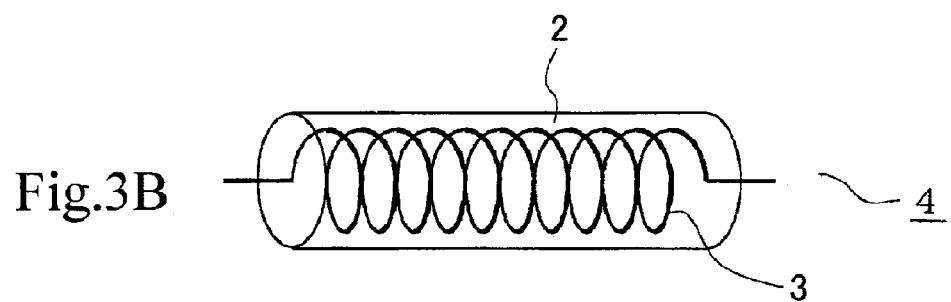

Thus there is obtained the polymer actuator constructed as shown in FIG. 1 and FIGS. 2A and 2B.

The resulting polymer actuator, in which the acidic gel/electrode complex serves as an anode and the basic gel/electrode complex serves as a cathode, was tested by applying a voltage of 2 V across the electrodes. It was found that the polymer actuator decreased in length between the heat-sealed parts from 45 mm to 25 mm as the result of contraction of both of the gel/electrode complexes functioning as the anode and cathode.

During contraction, no gas evolution from the gel/electrode complex was noticed.

EXAMPLE 2

In this example, the polymeric hydrogel for the gel/electrode complexes is prepared from an aqueous solution of monomer, crosslinking agent, and initiator by radical polymerization.

The monomer for the polymer having acidic functional groups is acrylic acid. The monomer for the polymer having basic functional groups is dimethylaminoethyl methacrylate. The crosslinking agent is N,N'-methylenebisarcylamide. The initiator is ammonium persulfate. The aqueous solution (as the gel precursor) is composed of the acidic monomer, basic monomer, crosslinking agent, and initiator in a molar ratio of 50:50:3:1.

The electrode is a coil (1 mm in diameter) of platinum wire (10 μm in diameter). It is placed in a glass tube, 1.5 mm in inside diameter and 30 mm long, and then it is fixed so that the axis of the coil coincides with the axis of the glass tube.

The glass tube is filled with the gel precursor solution. With its both ends closed by rubber stoppers, the filled glass tube is heated at 50° C. so that the gel precursor solution undergoes gelation. The resulting gel is discharged by applying pressure to one end of the glass tube. Thus there is obtained the amphoteric gel/electrode complex (in which the polymer gel contains both acidic and basic functional groups).

The thus obtained amphoteric gel/electrode complex is immersed in an aqueous solution of nitric acid (0.01 mol/dm$^3$) so that it is allowed to expand. Then the amphoteric gel/electrode complex is immersed in an aqueous solution of sodium nitrate (0.05 mol/dm$^3$) The amphoteric gel/electrode complex, in combination with a platinum counter electrode and a silver/silver chloride reference electrode, is given a potential of −1.0 V so that it is allowed to contract.

Two of the thus obtained amphoteric gel/electrode complexes are placed in a tubular polyethylene film, 6 mm in diameter and 50 mm long, with one end thereof heat-sealed.

The tubular polyethylene film is filled with an aqueous solution of sodium nitrate (0.05 mol/dm$^3$) from the open end. The open end is finally heat-sealed. Incidentally, heat sealing is performed in such a way that the coil extending outward from the ends of the tubular polyethylene film is fixed in the polyethylene film. The projecting end of the coil serves as the electrode terminal.

Thus there is obtained the polymer actuator as shown in FIG. 1 and FIGS. 2A and 2B.

The resulting polymer actuator, in which one of the electrode terminal of the gel/electrode complex serves as an anode and the other of the electrode terminal of the gel/electrode complex serves as a cathode, was tested by applying a voltage of 2 V across the electrode terminals. It was found that polymer actuator increased in length between the heat-sealed parts from 35 mm to 43 mm as the result of expansion of both of the gel/electrode complexes. During expansion, no gas evolution from the gel/electrode complex was noticed.

EXAMPLE 3

The same procedure as in Example 1 was repeated to prepare the polymer actuator except that the gel precursor solution was incorporated with as much Pd powder as 10 wt % of the monomer.

The resulting polymer actuator was tested by applying a voltage of 2 V across the acidic gel/electrode complex (as an anode) and the basic gel/electrode complex (as a cathode). It was found that polymer actuator decreased in length between the heat-sealed parts from 45 mm to 31 mm as the result of contraction of both of the gel/electrode complexes. During contraction, no gas evolution from the gel/electrode complex was noticed.

COMPARATIVE EXAMPLE

In this example, too, the polymeric hydrogel for the gel/electrode complexes is prepared from an aqueous solution of monomer, crosslinking agent, and initiator by radical polymerization.

A gel precursor solution is prepared in the form of aqueous solution of sodium acrylate (as a monomer for the polymer having basic functional groups), N,N'-methylene-bisacrylamide (as a crosslinking agent), and ammonium persulfate (as an initiator), which are mixed in a molar ratio of 100:3:1.

The electrode is a coil (1 mm in diameter) of platinum wire (10 μm in diameter). It is placed in a glass tube, 1.5 mm in inside diameter and 30 mm long, and then it is fixed so that the axis of the coil coincides with the axis of the glass tube.

The glass tube is filled with the gel precursor solution mentioned above. With its both ends closed by rubber stoppers, the filled glass tube is heated at 50° C. so that the gel precursor solution undergoes gelation. The resulting gel is discharged by applying pressure to one end of the glass tube. Thus there is obtained an acidic gel/electrode complex (in which the polymer gel contains acidic functional groups).

Also, another gel precursor solution is prepared in the form of aqueous solution of dimethylaminoethyl methacrylate (as a monomer for the polymer having basic functional groups), N,N'-methylenebisacrylamide (as a cross-linking agent), and ammonium persulfate (as an initiator), which are mixed in a molar ratio of 100:3:1.

The gel precursor solution is made into the basic gel/electrode complex (in which the polymer gel contains basic functional groups) in the same way as mentioned above for the acidic gel/electrode complex.

The thus obtained basic gel/electrode complex is immersed in an aqueous solution of nitric acid (0.01 mol/dm$^3$) so that it is allowed to swell.

The acidic gel/electrode complex and basic gel/electrode complex are placed in a tubular polyethylene film, 6 mm in diameter and 50 mm long. One end of the tube is heat sealed.

The tube is filled with an aqueous solution of sodium nitrate (0.05 mol/dm$^3$) through the open end. Incidentally, heat sealing is performed in such a way that the coil extending outward from the sealed ends is fixed in the polyethylene film.

Thus there is obtained the polymer actuator as shown in FIG. 1 and FIGS. 2A and 2B.

The resulting polymer actuator was tested by applying a voltage of 2 V across the acidic gel/electrode complex (as an anode) and the basic gel/electrode complex (as a cathode). It was found that the polymer actuator decreased in length between the heat-sealed parts from 45 mm to 41 mm as the result of contraction of both of the gel/electrode complexes.

During contraction, gas evolution from the gel/electrode complexes was noticed.

Further, the resulting polymer actuator was tested by applying a voltage of 3 V across the acidic gel/electrode complex (as an anode) and the basic gel/electrode complex (as a cathode). It was found that the polymer actuator decreased in length between the heat-sealed parts from 41 mm to 35 mm. However, during contraction, much gas evolution from the gel/electrode complexes was noticed.

It is apparent from Examples 1 to 3 and Comparative Example that the electrode made of a material capable of electrochemically occluding and releasing hydrogen permits the pH value to change in the polymer gel of the gel/electrode complex without gas evolution and water consumption, thereby making the enclosed actuator expand and contract linearly in a stable manner.

Exploitation In Industry

The polymer actuator according to the present invention includes a plurality of gel/electrode complexes arranged in an electrolytic solution such that the polymer gel changes in pH upon application of a voltage across the electrodes of the gel/electrode complexes and each gel/electrode complex changes in volume in response to the pH change. Therefore, the polymer actuator obviates the necessity for heating and cooling units, pumps, and reservoirs unlike conventional ones, and it is light in weight and capable of control with a low voltage, say 1 to 3 V.

Moreover, it is in the form of a closed actuator element that works without gas evolution (resulting from electrolytic reactions) and water consumption because the electrode in the gel/electrode complex is made of a material capable of occluding and releasing hydrogen electrolytically.

Since each of the gel/electrode complexes is composed of a polymer gel containing at least either of acidic or basic functional groups and an electrode embedded in the polymer gel, the polymer actuator is capable of linear expansion and contraction like skeletal muscles without curved displacement unlike conventional ones.

The linear expansion and contraction due to volume change in the gel/electrode complexes will be used to actuate robots' articulations (movable parts).

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A polymer actuator comprising: a plurality of gel/electrode complexes arranged in an electrolytic aqueous solution, at least one of said gel/electrode complexes being composed of a polymer gel containing acidic functional groups and electrode placed within the polymer gel and at least one of said gel/electrode complexes being composed of a polymer gel containing basic functional groups and electrode placed within the polymer gel, said electrodes being made of a material capable of occluding and releasing hydrogen electrochemically, such that the polymer gel in each gel/electrode complex changes in pH due to occlusion or release of hydrogen from the electrode due to application of voltage across the electrodes of the gel/electrode complexes, wherein the pH change in the polymer gel is achieved without the evolution of gas and the consumption of water, and each of the gel/electrode complexes changes in volume in response to the pH change.

2. The polymer actuator as defined in claim 1, wherein the electrode of the gel/electrode complex is made of any one of palladium and palladium-containing alloy.

3. The polymer actuator as defined in claim 1, wherein the electrode of the gel/electrode complex is made of hydrogen-occluding alloy coated with palladium.

4. The polymer actuator as defined in claim 1, wherein the electrode of the gel/electrode complex is in a form selected from the group consisting of a coil and a mesh.

5. The polymer actuator as defined in claim 1, wherein the electrode of the gel/electrode complex is in a form that includes any one of a granule and a fiber which is dispersed in the polymer gel.

6. The polymer actuator as defined in claim 1, wherein the electrode of the gel/electrode complex is composed of any one of a coiled and a mesh-like object and any one of a granular and a fibrous object.

7. The polymer actuator as defined in claim 1 which has more than one unit of the gel/electrode complex formed from a polymer gel containing acidic functional groups and more than one unit of the gel/electrode complex formed from a polymer gel containing basic functional groups.

8. The polymer actuator as defined in claim 1, wherein the polymer gel of the gel/electrode complex contains a mixture of a polymer containing acidic functional groups and a polymer containing basic functional groups.

9. The polymer actuator as defined in claim 1, wherein the gel/electrode complexes are arranged in a container which is filled with said electrolytic solution and said container has electrodes projecting from both ends.

10. The polymer actuator as defined in claim 9, wherein said container is capable of expanding or contracting in response to the volume change of the gel/electrode complexes.

11. The polymer actuator as defined in claim 1, wherein the acidic gel/electrode complexes contracts upon hydrogen ion release from the electrode, and expands upon occlusion of hydrogen ion into the electrode.

12. The polymer actuator as defined in claim 1, wherein the basic gel/electrode complexes expands upon hydrogen ion release from the electrode, and contracts upon occlusion of hydrogen ion into the electrode.

13. The polymer actuator as defined in claim 1, wherein the acidic gel/electrode complexes and the basic gel/electrode complex both contract and expand in the same direction upon application of voltage.

* * * * *